Nov. 18, 1930.  O. HAASE  1,782,265
STEERING MECHANISM FOR VEHICLES
Filed Nov. 28, 1927
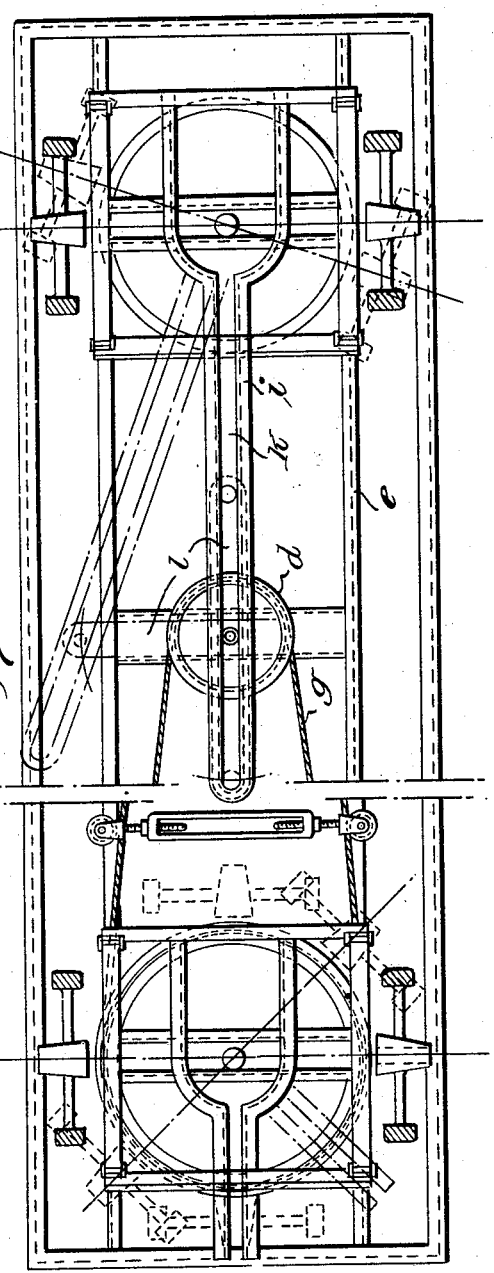
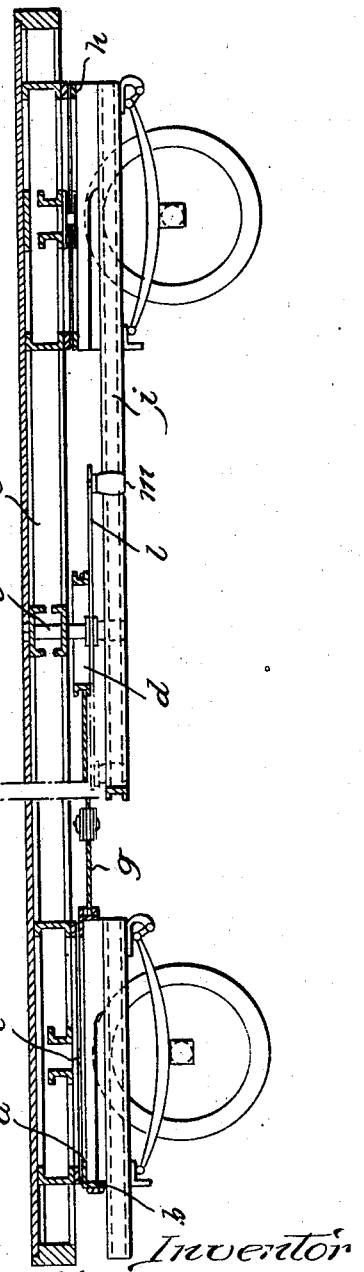
Inventor
Otto Haase
By Spear, Middleton, Donaldson & Hall
Attys Patented Nov. 18, 1930

1,782,265

UNITED STATES PATENT OFFICE

OTTO HAASE, OF DRESDEN-ALTSTADT, GERMANY

STEERING MECHANISM FOR VEHICLES

Application filed November 28, 1927, Serial No. 236,270, and in Germany November 29, 1926.

The present invention relates to a steering mechanism for vehicles, and more particularly for trailers, and has for its main object the provision of means for allowing large vehicles to be steered about a small curve by the use of an improved mechanism for causing the front and rear wheels of such vehicle to follow the same track.

Only in the case of wide streets, open spaces, courtways, yards etc., is it possible to steer large vehicles fitted with trailers through or around archways or the like with any degree of safety, as a relatively large space is required for the wide curve to be taken. If the space is limited, however, the operation is not only a very slow one but in many cases also liable to result in danger both to the brickwork as well as to the load being carried, and under certain conditions it may be impossible to drive the vehicle through the archway at all.

Various means have already been proposed in which by the use of pulleys, gear wheels, sprockets, toothed racks and similar organs, it is possible to ensure that the front and rear wheels follow the same track. Vehicles fitted with such arrangements of the hitherto known kind may certainly be steered with a somewhat greater degree of safety than without the same, but even in these cases an unnecessarily large space is still required and it is impossible to take a small curve. Thus, for example, the possibility of steering with the front axle at 90° is entirely out of the question, and moreover the danger also exists that in the case of unfavorable disposal of the load carried the vehicle, in a certain relative position of the front and rear wheels, may tip up. If it is sought to effect steering in a small curve, the rear wheels mostly tend to skid over the ground.

The present invention constitutes an improvement in such mechanisms employed to ensure that the front and rear wheels follow approximately the same track.

In the case of the invention, however, the various objections referred to are entirely eliminated, and it is possible without trouble or danger to effect steering through or around archways and the like with the front axle situated at 90° or more, so that only a very limited space is required.

For this purpose rope pulleys of the known kind are furnished at suitable points on the underside of the upper part of the vehicle. A rope pulley is firmly connected with the lower swivel ring at the front of the vehicle, and an additional rope pulley which, however, is merely half the size of the first one is situated in a manner to be rotary about a vertical axle in front of the swivel frame or bogie at the rear. To the lower swivel ring of the rear vehicle is secured a flat iron bar having a longitudinal slot, in such manner that a bolt mounted on the projecting end of an arm secured to the smaller pulley is capable of performing a positive sliding motion in the said longitudinal slot. The two pulleys are connected with each other by means of a rope or a chain.

The invention is illustrated by way of example in the accompanying drawing in which Fig. 1 is a view of the vehicle from below, and Fig. 2 is an elevation in part longitudinal section.

In the drawing $a$ represents the front swivel frame or bogie, and on the same is mounted the pulley $b$ centrally to the bolt $c$ and capable of rotation in a horizontal plane. A second pulley $d$ which, however, is merely half the size of the first one, is secured by means of a bolt $f$ on the underside of the body $e$ in front of the frame or bogie at the rear. Both pulleys $b$ and $d$ are connected by means of a rope $g$. To prevent slip of the rope on the pulleys the same may be passed around the said pulleys twice, secured at a suitable point, and also tensioned in the known manner, for example by the use of a jockey pulley.

On the swivel frame or bogie to the rear or on the lower swivel ring $h$ is mounted in horizontal fashion a flat iron ban $i$ having a longitudinal slot $k$, in such manner that a projecting part thereof when the vehicle is being steered oscillates over the smaller pulley $d$, and that the slot $k$ projects beyond an arm $l$ of suitable length mounted on the pulley $d$. The arm $l$ is mounted horizontally on the lower side of the pulley $d$ and in the normal position is situated parallel to the flat iron bar $i$, the arrangement being such that a round bolt $m$, which is situated at the end of the arm $l$ projecting over the edge of the pulley $d$, is capable of sliding in positive fashion in the longitudinal slot $k$.

The operation is as follows:

If, for example, the vehicle or vehicle shaft moves to the extent of 45° to the left, the front swivel frame or bogie together with the swivel ring $a$ is also moved to the left together with the pulley $b$. This rotation of the pulley $b$ to the extent of 45° is transmitted through the medium of the rope $g$ to the smaller pulley $d$. Since the latter is merely half the size of the pulley $b$, the pulley $d$ performs a rotation which is accordingly twice the size, i. e., 90°. The arm $l$ mounted on the pulley $d$ moves with its bolt $m$ on the projecting end in the slot $k$ of the bar $i$, and accordingly moves the rear steering wheel and wheels to the extent of, say, $22\frac{1}{2}°$ towards the right (Fig. 1). If the front wheels are rotated beyond 45°, the flat iron bar with the swivel ring $h$ and the rear wheels is moved again into the original position, so that upon rotation of the front wheels by 90° the rear wheels are again situated in a straight line with the upper part of the vehicle.

The bolt $m$ naturally requires to be adjustable on the arm in accordance with the nature of the vehicle, the axle base etc.

What I claim as new and desire to secure by Letters Patent is:

In a steering mechanism for vehicles, a front bogie, a pulley firmly secured thereto, a rear bogie, a second pulley which is smaller than the said first pulley mounted in front of the rear bogie, a rope transmitting the movement of the said first pulley to the said smaller pulley, an arm mounted on the said smaller pulley, a flat iron bar mounted on the rear bogie, a longitudinal slot in the said bar, and a bolt on the said arm engaging in the said slot, the arrangement being such that the movement of the said smaller pulley is transmitted in positive fashion to the rear bogie.

In testimony whereof I have affixed my signature.

OTTO HAASE.